US006550229B2

(12) United States Patent
Sperry et al.

(10) Patent No.: US 6,550,229 B2
(45) Date of Patent: Apr. 22, 2003

(54) DEVICE FOR SEALING TWO PLIES OF FILM TOGETHER, PARTICULARLY FOR ENCLOSING A FOAMABLE COMPOSITION IN A FLEXIBLE CONTAINER

(75) Inventors: Charles R. Sperry, Northampton, MA (US); Suzanne Scott, Springfield, VT (US)

(73) Assignee: Sealed Air Corporation (US), Saddle Brook, NJ (US)

( * ) Notice: Subject to any disclaimer, the term of this patent is extended or adjusted under 35 U.S.C. 154(b) by 8 days.

(21) Appl. No.: 09/760,105

(22) Filed: Jan. 12, 2001

(65) Prior Publication Data

US 2002/0092279 A1 Jul. 18, 2002

(51) Int. Cl.[7] .................................................. B65B 9/06
(52) U.S. Cl. ..................... 53/568; 53/329.2; 53/373.7; 53/374.4; 53/375.9
(58) Field of Search ........................ 53/568, 472, 329.2, 53/229.4, 373.7, 374.2, 374.3, 374.4, 375.4, 375.9, 370.7, 371.2, 371.4; 156/459; 219/244; 100/328

(56) References Cited

U.S. PATENT DOCUMENTS

| 3,196,068 | A | | 7/1965 | Schoder et al. | |
|---|---|---|---|---|---|
| 3,546,433 | A | * | 12/1970 | Ewing | .......................... 219/244 |
| 3,687,370 | A | | 8/1972 | Sperry | .......................... 239/112 |
| 3,735,551 | A | * | 5/1973 | Pratt | ........................... 53/433 |
| 3,901,759 | A | | 8/1975 | Highfield et al. | ............ 156/515 |
| 3,945,569 | A | | 3/1976 | Sperry | .......................... 239/112 |
| 4,426,023 | A | | 1/1984 | Sperry et al. | ................. 222/132 |
| 4,509,820 | A | * | 4/1985 | Murata et al. | ................. 156/86 |
| 4,512,136 | A | * | 4/1985 | Christine | ..................... 383/122 |
| 4,674,268 | A | | 6/1987 | Gavronsky et al. | ............ 53/468 |
| 4,800,708 | A | | 1/1989 | Sperry | .......................... 53/449 |
| 4,854,109 | A | | 8/1989 | Pinarer et al. | ................. 53/397 |
| 4,898,327 | A | | 2/1990 | Sperry et al. | ................... 239/1 |
| 5,027,583 | A | | 7/1991 | Chelak | .......................... 53/451 |
| 5,181,365 | A | * | 1/1993 | Garvey et al. | .............. 493/196 |
| 5,246,527 | A | * | 9/1993 | Bjorkman et al. | ........ 156/308.4 |
| 5,255,847 | A | | 10/1993 | Sperry et al. | ................. 239/112 |
| 5,335,483 | A | | 8/1994 | Gavronsky et al. | ............ 53/451 |
| 5,355,656 | A | | 10/1994 | Perrett | ........................ 53/373.7 |
| 5,376,219 | A | | 12/1994 | Sperry et al. | ................ 156/515 |
| 5,411,625 | A | | 5/1995 | Focke et al. | ................. 156/359 |
| 5,679,208 | A | * | 10/1997 | Sperry et al. | ................ 156/251 |
| 5,727,370 | A | | 3/1998 | Sperry | .......................... 53/472 |
| 5,776,510 | A | | 7/1998 | Reichental et al. | .......... 425/112 |
| 6,003,288 | A | | 12/1999 | Sperry et al. | .................. 53/552 |

FOREIGN PATENT DOCUMENTS

| FR | 2157760 | 10/1971 |
|---|---|---|
| FR | 2537914 | 12/1982 |
| GB | 1063119 | 12/1964 |
| WO | WO 00/78522 A1 | 12/2000 |

* cited by examiner

*Primary Examiner*—Stephen F. Gerrity
*Assistant Examiner*—Thanh Truong
(74) *Attorney, Agent, or Firm*—Thomas C. Lagaly (57) ABSTRACT

A device for sealing two plies of plastic film together generally includes an electrically conductive heating element and a rotatable support cylinder having an outer, circumferential surface, the cylinder being positioned in abutting relationship with the heating element and capable of rotating against the heating element, which is in fixed position, along a predetermined contact arc such that less than a complete circumference of the outer surface of the cylinder is in contact with the heating element.

24 Claims, 9 Drawing Sheets

DEVICE FOR SEALING TWO PLIES OF FILM TOGETHER, PARTICULARLY FOR ENCLOSING A FOAMABLE COMPOSITION IN A FLEXIBLE CONTAINER

BACKGROUND OF THE INVENTION

The present invention relates to foam-in-place packaging and, more particularly, to an improved sealing device for making foam-in-place packaging cushions.

Foam-in-place packaging is a highly useful technique for on demand protection of packaged objects. In its most basic form, foam-in-place packaging comprises injecting foamable compositions from a dispenser into a container that holds an object to be cushioned. Typically, the object is wrapped in plastic to keep it from direct contact with the rising (expanding) foam. As the foam rises, it expands into the remaining space between the object and its container (e.g. a corrugated board box) thus forming a custom cushion for the object.

A common foamable composition is formed by mixing an isocyanate compound with a hydroxyl-containing material, such as a polyol (i.e., a compound that contains multiple hydroxyl groups), typically in the presence of water and a catalyst. The isocyanate and polyol precursors react to form polyurethane. At the same time, the water reacts with the isocyanate compound to produce carbon dioxide. The carbon dioxide causes the polyurethane to expand into a foamed cellular structure, i.e., a polyurethane foam, which serves to protect the packaged object.

In other types of foam-in-place packaging, an automated apparatus produces flexible bags from flexible, plastic film and dispenses a foamable composition into the bags as the bags are being formed. As the composition expands into a foam within the bag, the bag is sealed shut and typically dropped into a container holding the object to be cushioned. The rising foam again tends to expand into the available space, but does so inside the bag. Because the bags are formed of flexible plastic, they form individual custom foam cushions around the packaged objects. Exemplary types of such packaging apparatus are assigned to the assignee of the present invention, and are illustrated, for example, in U.S. Pat. Nos. 4,800,708, 4,854,109, 5,027,583, 5,376,219, and 6,003,288, the contents of each of which are incorporated entirely herein by reference.

As will be noted from the foregoing patents, the typical method of forming a foam-in-place cushion from a plastic bag is to heat-seal plies of plastic film material together both transversely and longitudinally as they are being fed from a stock supply to form a generally rectangular bag with the foam inside. In alternative embodiments, the stock supply of plastic film material can be fed in center-folded fashion so that one side of the bag is a fold, rather than a heat seal. Foam-in-place packaging apparatus that operate in accordance with such methods have gained rapid and wide acceptance in the marketplace and have served their purposes well.

However, improvement in the operation of such apparatus is continually sought. One aspect in particular where improvement is desired concerns the manner in which the film plies are sealed together, especially in the longitudinal direction, i.e., the direction in which the film plies move as they are conveyed through the packaging apparatus. Conventional devices for making longitudinal heat seals generally include a sealing wire or other electrical heating means wrapped around and affixed to the circumference of a rotatable cylinder such that the wire rotates along with the cylinder. To effect a heat seal, the entire wire is heated, by sending an electrical current therethrough, and the cylinder is brought into rotational contact with the film plies to be sealed as the film plies move against and past the heated cylinder. While this approach has generally been effective, its main drawback is that consistent sealing temperatures are difficult to achieve.

The inventors hereof have determined that the cause of such inconsistent sealing temperatures is due to two primary factors: first, the entire wire is heated and, second, the wire is wrapped about the entire circumference of the rotatable cylinder. As a number of foam-in-place cushions are made in succession during continuous operation of the packaging apparatus, this configuration results in a gradual but steady increase in the temperature of the cylinder because the cylinder continually absorbs heat from the wire at a faster rate than the rate at which the heat can be dissipated to the air. Without careful control and monitoring of the longitudinal heat-seal device, the ever-changing temperature of the rotating cylinder often results in inconsistent seals being made between the film plies that form the flexible container for the expanding foam. As a consequence, insufficient heat necessary to form complete (strong) heat-seals may be applied at the beginning of a cushion-making session, which can cause the seal to be forced open as the foam expands within the cushion, and/or an excessive amount of heat may be applied toward the end of the session, which causes the cylinder to melt through the film plies and produce holes in the cushion. When the heat-seal device melts through the film plies, an outer strip form one or both film plies very often separates from the rest of the film and wraps around the longitudinal heat-seal device. This results in the necessity of shutting-down the cushion-making apparatus and extricating the film strip from the heat-seal device. Typically, the strip is tightly wound around the device and/or partially melted such that removal of the strip is a difficult and time-consuming process.

Another drawback of the 'wrap-around' heat-seal device as discussed above is that routine maintenance procedures therefor are more cumbersome and time-consuming than would otherwise be desired. In particular, the sealing wire is difficult to remove and replace when worn.

Finally, since the entire wire must be heated, the energy requirements for the sealing device are higher than desired.

Therefore, the need exists for an improved heat-seal device that is suitable for forming longitudinal heat-seals for foam-in-place packaging cushions.

SUMMARY OF THE INVENTION

That need is met by the present invention, which, in one aspect, provides a device for sealing two plies of plastic film together, comprising:

a. an electrically conductive heating element having a first end secured to a first node and a second end secured to a second node; and b. a rotatable support cylinder having an outer, circumferential surface, the cylinder being positioned in abutting relationship with the heating element and capable of rotating against the heating element along a predetermined contact arc such that less than a complete circumference of the outer surface of the cylinder is in contact with the heating element, whereby, two plies of juxtaposed plastic film may be sealed together by bringing the juxtaposed film plies into contact with the heating element along the contact arc and causing sufficient current to flow through the heating element that the heating element heats to a sealing temperature that causes the juxtaposed film plies to seal together.

Another aspect of the present invention is an apparatus for dispensing fluid into flexible containers and enclosing the fluid within the containers, comprising:

a. a mechanism that conveys a web of film along a predetermined path of travel, the film web comprising two juxtaposed plies of plastic film that define a partially-formed flexible container;

b. a dispenser through which fluid may flow in predetermined amounts, said dispenser positioned adjacent the travel path of the film web such that the dispenser can dispense the fluid into the partially-formed flexible container; and c. a device for sealing the plies of plastic film together so that the partially-formed container can be completed to thereby enclose the fluid therein, with the contact arc of the sealing device being positioned in the travel path of the film web, whereby, the two plies of juxtaposed plastic film are sealed together when the conveying mechanism brings the film web into moving contact with the heating element along the contact arc and sufficient current is caused to flow through the heating element that the heating element heats to a sealing temperature that causes the juxtaposed film plies to seal together.

A further aspect of the present invention is a system for dispensing fluid into flexible containers and enclosing the fluid within the containers, comprising:

a. a web of film comprising two juxtaposed plies of plastic film that define a partially-formed flexible container;

b. a mechanism that conveys the film web along a predetermined path of travel;

c. a fluid source containing therein a fluid;

d. a dispenser through which fluid may flow in predetermined amounts, the dispenser being in fluid communication with the fluid source and positioned adjacent the travel path of the film web such that the dispenser can dispense the fluid into the container; and e. a device as described above for sealing the plies of plastic film together.

These and other aspects and features of the invention may be better understood with reference to the following description and accompanying drawings.

DETAILED DESCRIPTION OF THE INVENTION

Figure 1:
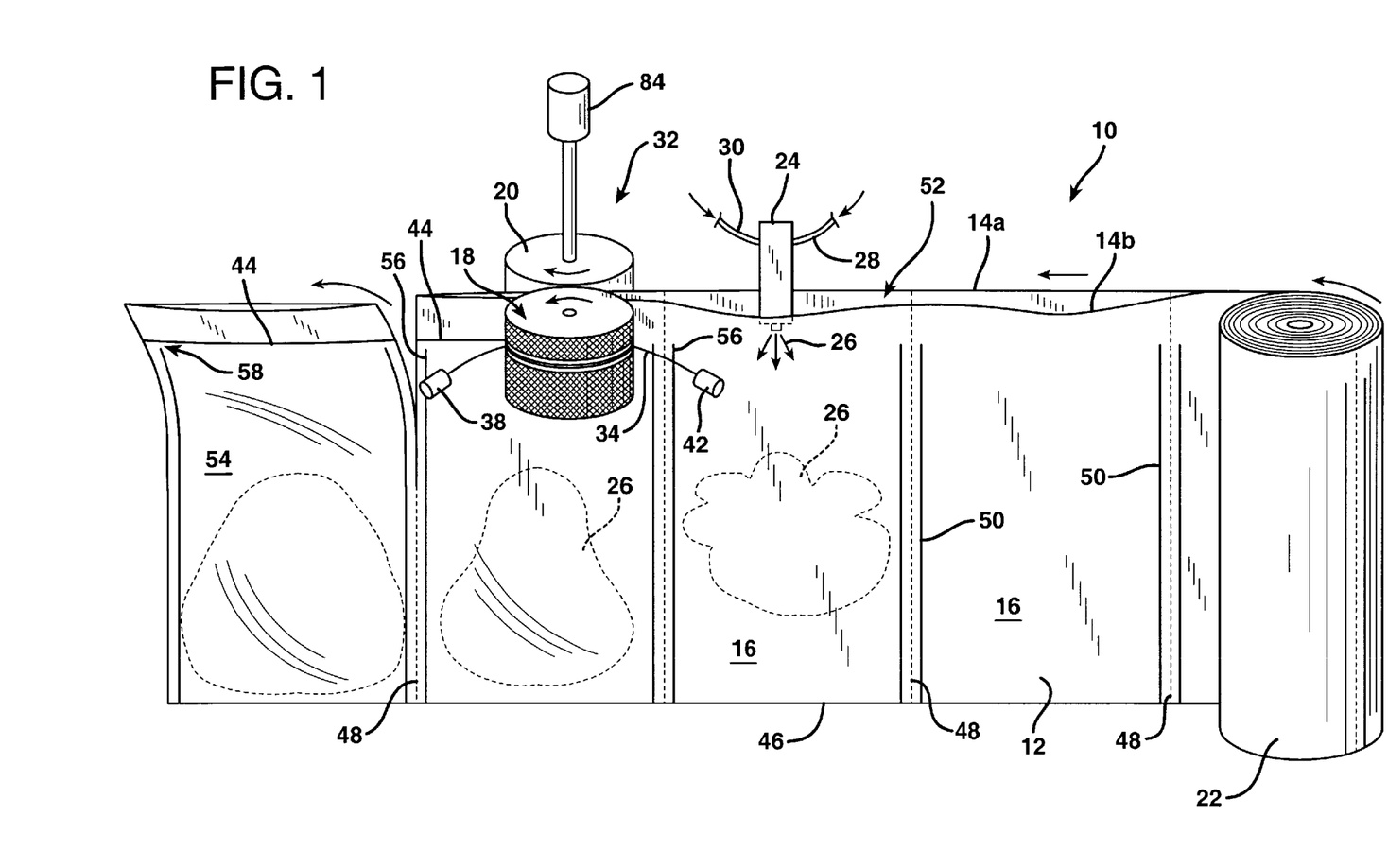
FIG. 1 is a schematic view of an apparatus in accordance with the present invention in which partially-formed containers provided by a center-folded film web are injected with a foamable composition and then sealed closed.

FIG. 1 schematically illustrates an apparatus 10 in accordance with the present invention for dispensing fluid into flexible containers and enclosing the fluid within the containers. Also illustrated is a web of film 12 comprising two juxtaposed plies 14a and 14b of plastic film that define partially-formed flexible containers 16. The film web may comprise any flexible material that can be manipulated by apparatus 10 as herein described, including various thermoplastic or fibrous materials, e.g., polyethylene homopolymer or copolymer, polypropylene homopolymer or copolymer, paper, etc.

Apparatus 10 includes a mechanism that conveys the film web 12 along a predetermined path of travel. Such conveying mechanism may include a pair of counter-rotating cylinders 18 and 20 that pull the film web 12 through apparatus 10 along a predetermined travel path, and also a device (not shown) to position and support a storage roll 22 from which film web 12 may be advanced. The "travel path" of film web 12 simply refers to the route that the film web traverses while being conveyed through the apparatus 10, as indicated by the shape assumed by the film web due to the manipulation thereof by apparatus 10. As will be appreciated, the particular conveying mechanism components and travel path selected is not critical to the practice of the present invention, and various other conveying mechanism components and travel-path configurations may be employed as desired, including additional cylinders or rollers such as guide rollers, e.g., to provide a more elaborate travel path in order to reduce the 'footprint' of the apparatus.

Apparatus 10 further includes a dispenser 24 through which a fluid 26 may flow in predetermined amounts, the dispenser being in fluid communication with a fluid source (not shown) containing therein fluid 26. Dispenser 24 is positioned adjacent to or in the travel path of film web 12 such that the dispenser can dispense the fluid 26 into the partially formed container 16 as shown. Any desired fluid may be dispensed into the containers in accordance with the present invention, including gaseous fluids such as air in order to make inflated air cushions for packaging and other applications; pumpable foods such as soups, sauces, and condiments; flowable foods such as shredded cheese; industrial liquids such as detergents, chemical solutions, etc.; medical fluids such as saline solutions; and foamable compositions for foam-in-place packaging.

The apparatus 10 as presently illustrated is particularly well suited for the latter application, i.e., for making foam-in-place cushions. Thus, fluid 26 is preferably selected from polyols, isocyanates, and mixtures of polyols and isocyanates. For example, one or more polyols may be supplied from a fluid source (not shown) to dispenser 24 via supply line 28, while one or more isocyanates may be supplied from a second fluid source (not shown) to dispenser 24 via supply line 30. Suitable fluid sources for the polyol(s) and isocyanate(s) may include a separate drum or other container for each chemical. The polyol(s) and isocyanate(s) may flow through respective supply lines 28, 30 by action of separate pumps (not shown) that are in fluid communication with both the fluid source and supply lines 28, 30. Alternatively, the fluid sources may be positioned above dispenser 24 so that the polyol(s) and isocyanate(s) flow through the supply lines 28, 30 by force of gravity.

Dispenser 24 receives and mixes the polyol(s) and isocyanate(s) and dispenses the resultant mixture of fluids, indicated at 26, into the partially-formed containers 16. As explained in the background section hereinabove, the polyol(s) and isocyanate(s) are foam precursors which, when mixed, produce a foamable composition that reacts to form a polyurethane foam. Polyurethane foam is thus injected into each container 16. The amount of such foamable fluid to be dispensed into each container 16 by dispenser 24 is predetermined, based on, e.g., the internal volume within the container, the degree to which the fluid expands as it forms into a foam, the amount of foam that is desired to be contained in each completed container/packaging cushion, etc. Such determination of the predetermined amount of fluid to be dispensed by dispenser 24 is readily and commonly made by those having ordinary skill in the art to which this invention pertains, and requires no undue experimentation.

As the foam expands in each container, it may be placed in a mold to produce a packaging cushion having a pre-defined shape as disclosed, e.g., in commonly assigned U.S. Pat. No. 5,776,510. Alternatively, container 16 with the expanding fluid (foamable composition) 26 therein may be placed against a product to be packaged and further placed in a box or other shipping vessel to form an individualized packaging cushion for such product.

Suitable dispensers of the type illustrated at 24 are well known and are disclosed, e.g., in commonly-assigned U.S. Pat. Nos. 4,898,327 and 5,255,847, and in a copending patent application entitled FLUID DISPENSER HAVING IMPROVED CLEANING SOLVENT DELIVERY SYSTEM (Sperry et al.), bearing attorney docket number D-20086-01 and filed on the same day as the present application; the disclosures of each of the foregoing are hereby incorporated herein by reference. Other suitable dispensers, albeit in the form of a hand-held mixing gun, are disclosed in commonly-assigned U.S. Pat. Nos. 3,687,370, 3,945,569, and 4,426,023, the disclosures of which are also hereby incorporated herein by reference.

As an alternative to a dispenser as described above that mixes the polyol(s) and isocyanate(s) before dispensing the resultant mixture into the container, a dispenser of the type disclosed in commonly-owned U.S. Pat. No. 5,727,370 may be used. The disclosure of U.S. Pat. No. 5,727,370 is hereby incorporated herein by reference. Such a dispenser as disclosed in the '370 patent injects the polyol(s) and isocyanate(s) into the container through separate discharge nozzles such that the two foam precursors do not begin to mix and form foam until after being introduced into the container.

A further component of apparatus 10 is a device 32 for sealing the plies 14a,b of plastic film 12 together to enclose the fluid 26 within containers 16. Sealing device 32, which is illustrated in more detail in FIGS. 2–4, includes an electrically conductive heating element 34 having a first end 36 secured to a first node 38 and a second end 40 secured to a second node 42. Sealing device 32 produces a longitudinal heat-seal 44 between film plies 14a,b to seal the two plies together. The heat-seal 44 is produced by causing sufficient electrical current to flow through heating element 34 that it heats to a predetermined sealing temperature. Such sealing temperature is, in turn, sufficient to cause the juxtaposed film plies 14a,b to seal together by temporarily becoming fully or partially molten in the area of contact with the heating element 34.

In order to avoid melting through the film plies and to minimize the amount of electrical energy required to effect heat-seal 44, heating element 34 is generally formed from a thin and flexible material, e.g., a wire or ribbon, and is therefore somewhat fragile. Thus, it is preferable to position rotatable cylinder 18 in abutting relationship with heating element 34 to support the heating element and retain it in the proper position to form heat-seal 44.

When apparatus 10, including dispenser 24 and sealing device 32, is combined with a film web 12 as shown and one or more fluid sources in communication with dispenser 24, such combination is deemed herein to be a "system" for dispensing fluid into flexible containers and enclosing the fluid within the containers.

Film web 12 may be a single, center-folded film with the center-fold 46 being disposed along the longitudinal center of the film web and the folded halves of the film forming the two juxaposed film plies 14a, b. By virtue of being juxta-posed in apparatus 10, the film plies 14a, b provide a partially-formed flexible container into which fluid 26 is dispensed by dispenser 24 prior to being completed by sealing device 32 and, optionally, other sealing devices that may also be included. In the apparatus 10 as shown, sealing device 32 completes the containers 16 and thereby fully encloses fluid 26 therein. The longitudinal heat-seal 44 produced by sealing device 32 operates in cooperation with perforated, transverse seams 48 and transverse heat-seals 50, both of which partition film web 12 into a plurality of individual, partially-formed containers 16. The term "transverse" is used to denote the alignment of the perforations 48 and heat-seals 50, which are generally perpendicular to the longitudinal direction in which the film web 12 moves through apparatus 10. Such perforated seams 48 and pre-formed heat-seals 50 are not required in the apparatus and system of the present invention, and may be replaced if desired by the inclusion in apparatus 10 of more conventional transverse severing/sealing devices, such as those disclosed in the above-incorporated patents. When such transverse partitions 48, 50 are employed, they may be pre-formed in film web 12, i.e., by equipment that is separate from apparatus 10 prior to placing the film web in the apparatus as shown, or may be formed "in-situ", i.e., by appropriate equipment associated with apparatus 10 as the film web is unrolled from storage roll 22.

In either event, i.e., whether the transverse partitions 48, 50 are pre-formed or formed in-situ, sealing device 32 completes the partially-formed containers 16 by forming longitudinal heat-seal 44. Each of the partially-formed containers 16 have three closed edges as formed by a pair of transverse heat-seals 50 and the longitudinal center-fold 46 as shown. The upper longitudinal edge 52 remains open and thereby allows dispenser 24 to inject fluid 26 into the containers 16 via the open edge 52, i.e., between film plies 14a, b. After fluid 26 is injected into a container 16, the entire film web 12 is indexed in the direction of the arrow (i.e., to the left as illustrated in FIG. 1) so that the container 16 that had just been injected with fluid 26 is sealed closed, i.e., the open longitudinal edge 52 of such container is sealed closed when sealing device 32 seals film plies 14a,b together via heat-seal 44. In this manner, a completed container 54 is formed, which may be separated from the rest of the film web 12 by tearing through the perforated seam 48 as shown once the completed container has been indexed beyond the sealing device 32.

When fluid 26 is a foamable composition, it may be desirable to space longitudinal heat-seal 44 from one or both of the upper ends 56 of transverse heat-seals 50 as shown. The resultant gap between the ends 56 of transverse heat-seals 50 and longitudinal heat-seal 44 provides vents 58, which allow excess gas generated by the foaming reaction to escape from the completed container 54. At the same time, since the vents 58 are located in the upper corners of the completed container 54, escape of the expanding foam from the container is unlikely. If a vent is not needed or desired, e.g., when fluid 26 is a liquid that does not produce gas or the fluid is a gas such as air that is intended to remain trapped inside the container 54 (i.e., to make an air cushion), the ends 56 of transverse heat-seals 50 may be extended toward the longitudinal edge 52 of film web 12 and/or longitudinal heat-seal 44 may be lowered such that the transverse heat-seals 50 intersect with the longitudinal heat-seal 44. In this manner, fluid 26 would be hermetically sealed within the finished container 54.

Further details concerning the film web 12 shown in FIG. 1 and the method by which it is converted into foam-containing cushions are disclosed in a copending patent application entitled APPARATUS FOR DISPENSING FLUID INTO PRE-FORMED, FLEXIBLE CONTAINERS AND ENCLOSING THE FLUID WITHIN THE CONTAINERS (Sperry et al.), bearing attorney docket number D-20085-01 and filed on the same day as the present application, the disclosure of which is hereby incorporated herein by reference.

As an alternative to film web 12 having perforated transverse seams 48 and separate transverse heat-seals 50 as shown in FIG. 1, a simpler center-folded film web may be employed without such features as disclosed in the above-incorporated U.S. Pat. No. 6,003,288, in which a device for transversely sealing the film web and separating a completed container from the rest of the film web is positioned "downstream" of the longitudinal heat-seal device. The transverse sealing/separating device operates by pressing a heated wire against the film webs, wherein the wire is heated to a temperature sufficient to both seal and sever the film plies. This creates a final transverse seal to complete a container, severs the container from the rest of the film web, and forms a transverse seal for the next container to be injected with fluid. Instead of the 'wrap-around' heat-seal device as disclosed in the '288 patent and described hereinabove in the Background section, a longitudinal seal opposite the folded longitudinal edge is made with sealing device 32 in accordance with the present invention and illustrated in FIG. 1.

As a further alternative, instead of using a single, center-folded film web, two separate, juxtaposed film plies may be employed as disclosed, e.g., in the above-incorporated U.S. Pat. No. 5,027,583. In such an embodiment, a pair of sealing devices 32 are used to create opposing longitudinal edge seals (in replacement of the more conventional 'wrap-around' heat-seal devices as disclosed in those patents and described above), while a separate transverse severing/sealing device is employed as described immediately above to simultaneously form the final transverse seal to complete a container, sever the completed container from the rest of the film web, and form a transverse seal for the next container to be injected with fluid.

In both of the foregoing alternative embodiments, both film plies are juxtaposed while being conveyed through the apparatus of the present invention, and thereby constitute a partially-formed container into which a fluid is dispensed. Depending on whether a single, center-folded film or two films are used, one or two sealing devices 32 form longitudinal heat-seals between the film plies so that individual containers can be completed to thereby enclose the fluid therein. Typically, the individual containers are continually formed at the same time that they are injected with fluid, with final closure occurring after a predetermined amount of fluid has been added. Unlike the system and apparatus shown in FIG. 2, the final closure for each container is not made by the longitudinal sealing device 32, but is instead made by a transverse severing/sealing device.

Film web 12, whether a single, center-folded film as shown or two separate films as discussed above, is preferably a flexible, thermoplastic film, and may be formed from any polymeric material capable of being formed into a flexible container as described herein. Non-limiting examples of suitable polymers include polyethylene homopolymers, such as low density polyethylene (LDPE) and high density polyethylene (HDPE), and polyethylene copolymers such as, e.g., ionomers, EVA, EMA, heterogeneous (Zeigler-Natta catalyzed) ethylene/alpha-olefin copolymers, and homogeneous (metallocene, single-cite catalyzed) ethylene/alpha-olefin copolymers. Ethylene/alpha-olefin copolymers are copolymers of ethylene with one or more comonomers selected from $C_3$ to $C_{20}$ alpha-olefins, such as 1-butene, 1-pentene, 1-hexene, 1-octene, methyl pentene and the like, in which the polymer molecules comprise long chains with relatively few side chain branches, including linear low density polyethylene (LLDPE), linear medium density polyethylene (LMDPE), very low density polyethylene (VLDPE), and ultra-low density polyethylene (ULDPE). Various other materials are also suitable such as, e.g., polypropylene homopolymer or polypropylene copolymer (e.g., propylene/ethylene copolymer), polyesters, polystyrenes, polyamides, polycarbonates, etc. The film(s) may be monolayer or multilayer films and can be made by any known coextrusion process by melting the component polymer(s) and extruding or coextruding them through one or more flat or annular dies.

Figure 2:
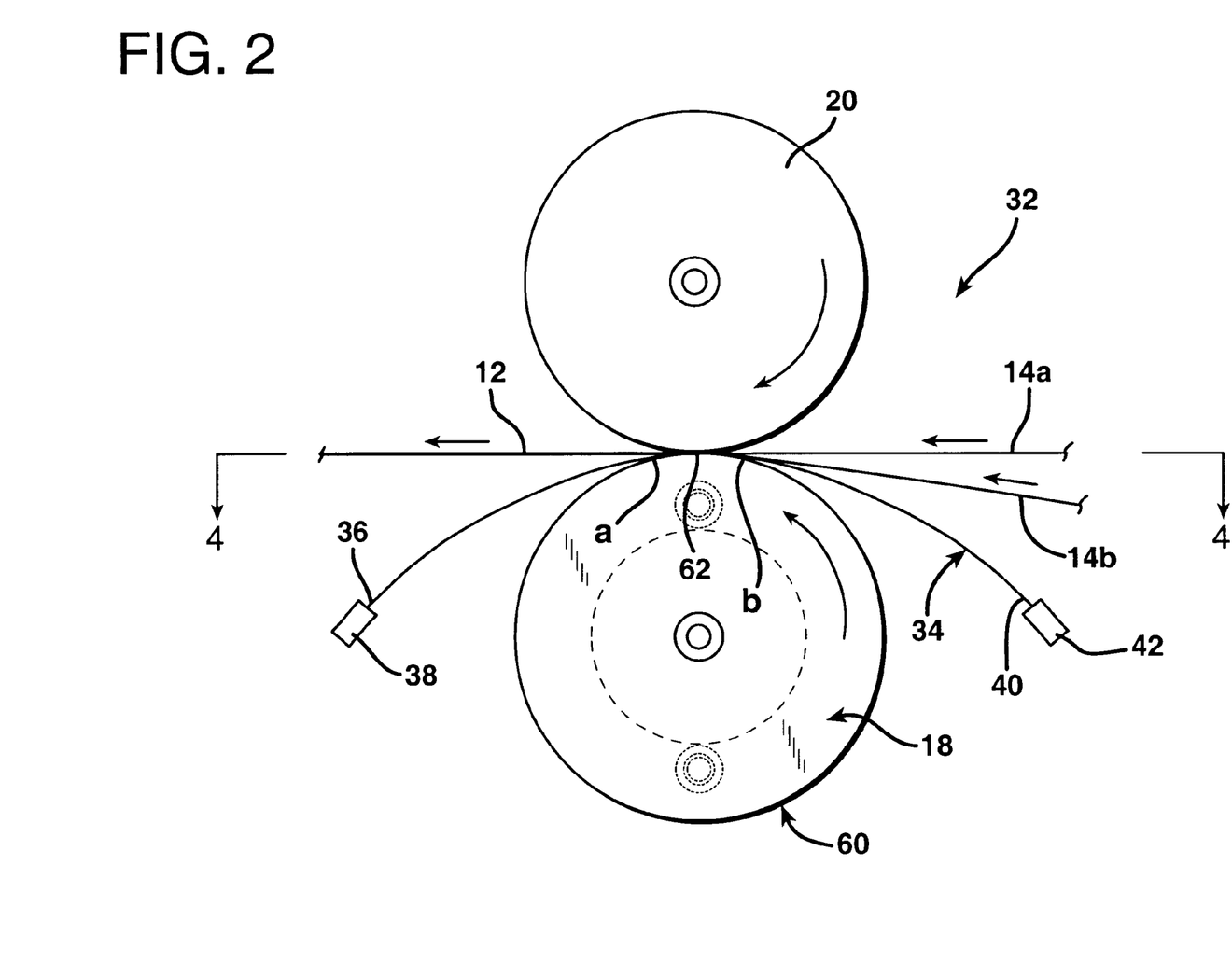
FIG. 2 is a plan view of the sealing device 32 illustrated in FIG. 1.
Figure 3:
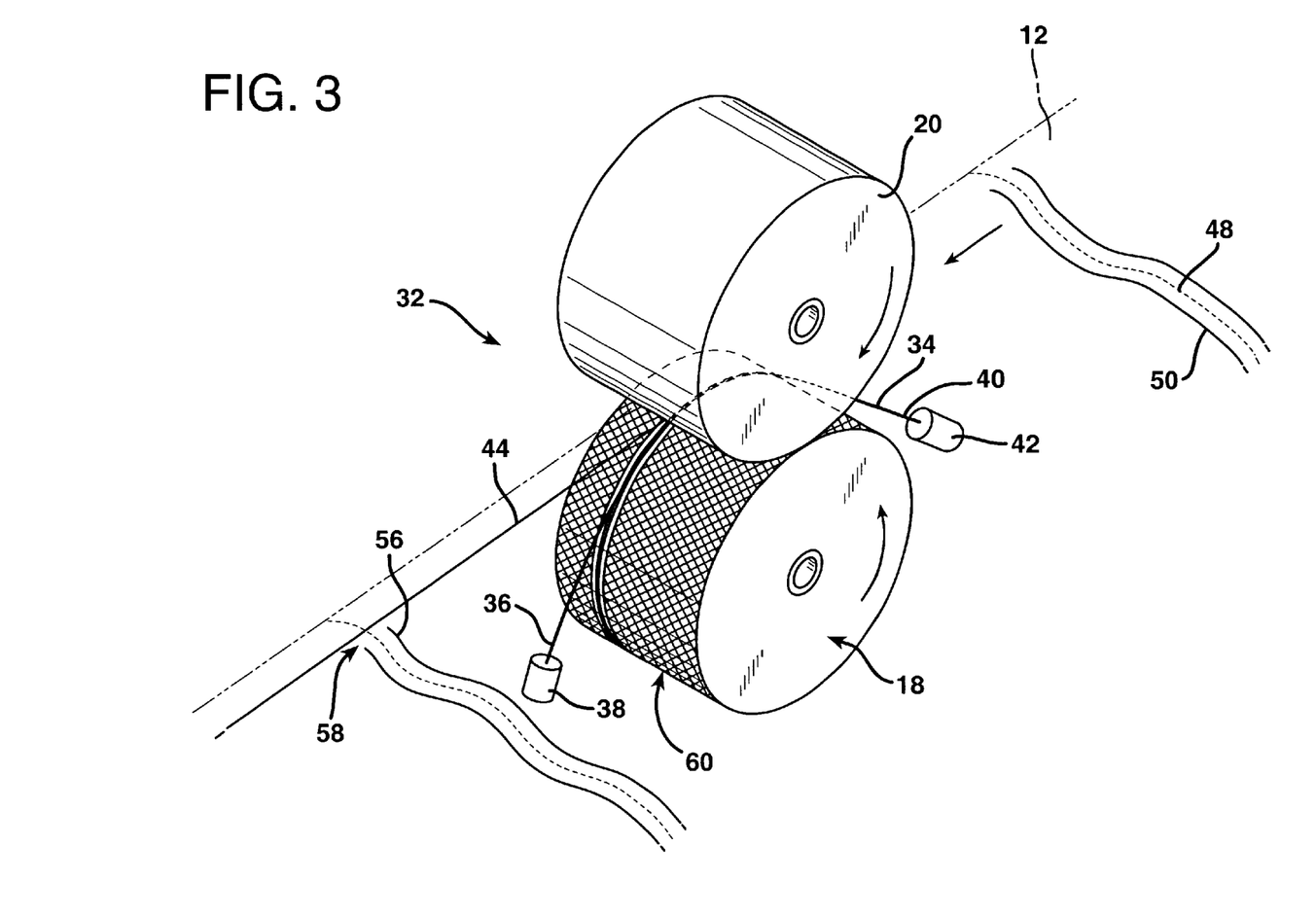
FIG. 3 is a perspective view of the sealing device shown in FIG. 2, wherein the film web 12 is shown in phantom for clarity.
Figure 4:
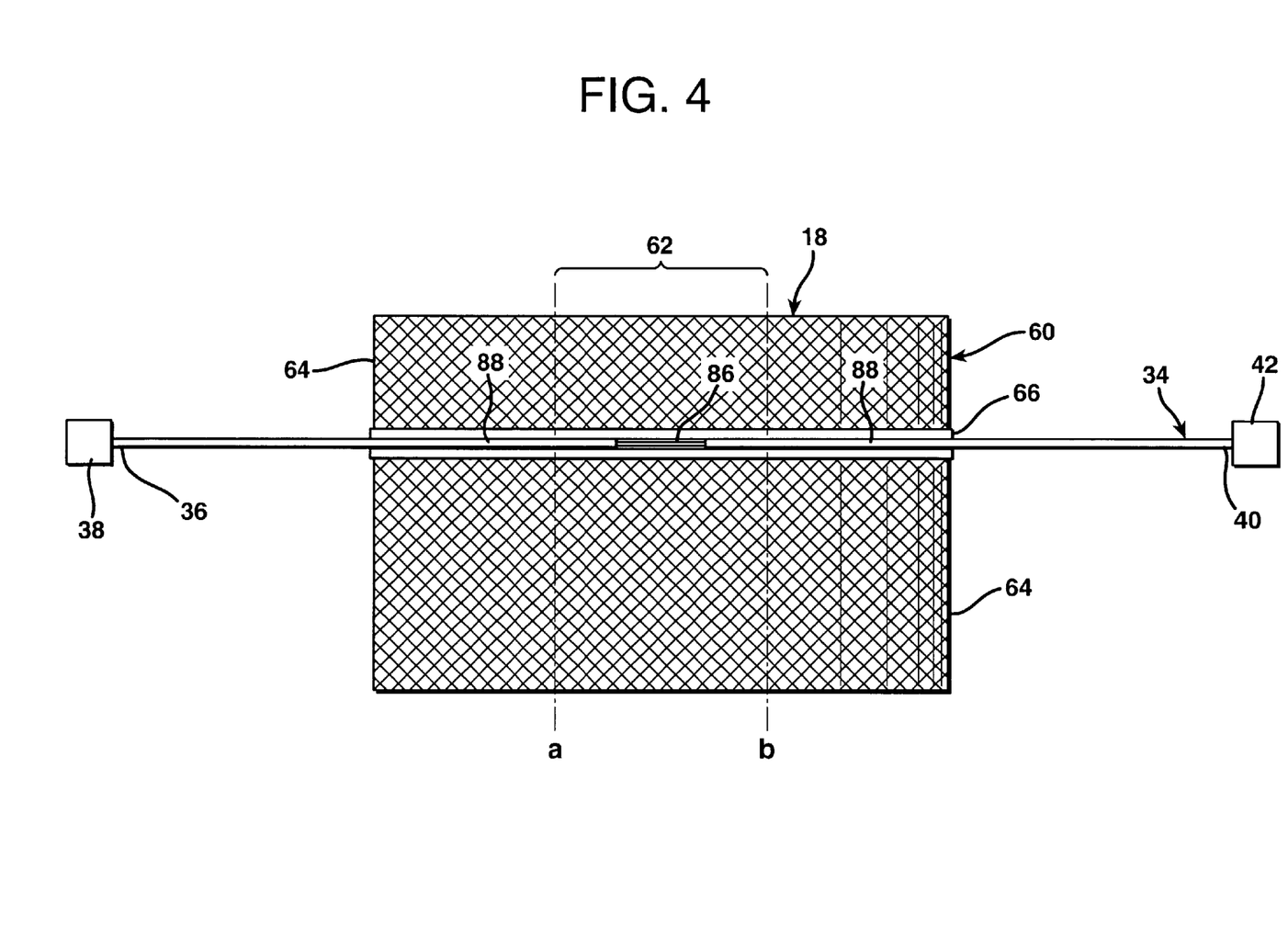
FIG. 4 is an elevational view of the sealing device as taken along lines 4—4 in FIG. 2.

Referring now to FIGS. 2–3, sealing device 32 will be described in greater detail. As shown perhaps most clearly in FIG. 2, rotatable support cylinder 18 has an outer, circumferential surface 60, is positioned in abutting relationship with the heating element 34, and is capable of rotating against the heating element along a predetermined contact arc 62 such that less than a complete circumference of the outer surface 60 of cylinder 18 is in contact with heating element 34. FIGS. 2 and 4 indicate that contact arc 62 extends from point "a" to point "b" along the outer surface 60 of cylinder 18. The heating element 34 is secured at ends 36 and 40 by respective nodes 38 and 42 as the cylinder 18 rotates against the heating element. The two juxtaposed plies 14a, b of plastic film 12 are sealed together by bringing the juxtaposed film plies into contact with the heating element 34 along contact arc 62 and causing sufficient current to flow through the heating element that it heats to a sealing temperature sufficient to cause the film plies 14a, b to seal together.

By positioning the cylinder 18 such that only a portion of the circumference 60 is in contact with the heating element, a smaller amount of heat is transferred to the cylinder, relative to conventional sealing devices in which the heating element is wrapped about the entire circumference of the support cylinder, so the cylinder is much less likely to build-up heat and thereby increase in temperature as the sealing device 32 is used in continuous operation. This, in turn, reduces the likelihood that the sealing device will burn through the film web 12. The contact arc 62 between the heating element 34 and cylinder 18 may be of any desired extent, e.g., ranging from about 1/30 to about 1/2 of the total circumference 60 of cylinder 18. More preferably, the contact arc 62 ranges from about 1/20 to about 1/3 of the circumference of cylinder 18 and, more preferably still, from about 1/10 to about 1/4 of the total circumference 60 of cylinder 18. For example, heating element 34 may be in contact with support cylinder 18 at a contact arc 62 that spans 1/16 of the total circumferential distance around the outer surface 60 of the cylinder, e.g., when the outer surface 60 of support cylinder 18 has a total circumference of 8 inches and the contact arc 62 spans a distance of 1.5 inches. Thus, in this example, only 1.5 inches of the 8 total inches of outer surface 60 are in contact at any one time with heating element 34.

The actual span of the contact arc 62 employed for a given application can be determined by those of ordinary skill in the art without undue experimentation, based primarily on the rate at which heat is transferred to the support cylinder 18 by the heating element 34 verses the rate at which heat can be dissipated from the cylinder 18. In general, the size of contact arc 62 is directly proportional to the amount of heat that is transferred from heating element 34 to cylinder 18. Another consideration in determining the span of contact arc 62 is the friction generated between the moving (rotating) cylinder 18 and non-moving heating element 34, with the size of contact arc 62 being directly proportional to the amount of such frictional that is generated. Accordingly, it is generally preferred to minimize the size of contact arc 62 the greatest extent possible while, at the same time, allowing the sealing device 32 to perform its intended heat-sealing function in as flawless a manner as possible.

Figure 5:
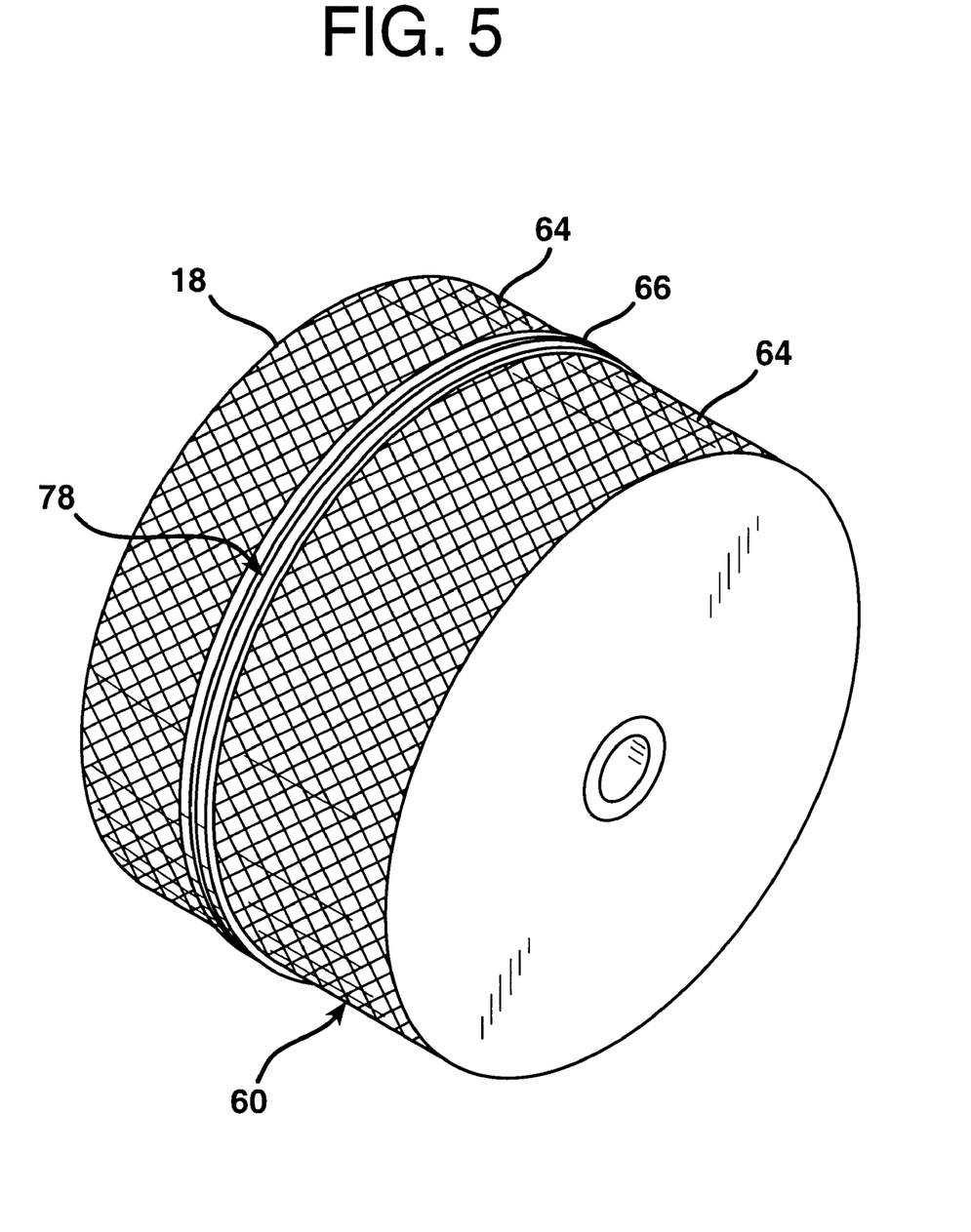
FIG. 5 is a perspective view of the support cylinder 18 as shown in FIGS. 1–4.

FIGS. 3–5 illustrate a preferred feature of the invention, in which support cylinder 18 is a composite, comprising a first component 64 having a relatively high degree of thermal conductivity and a second component 66 having a relatively low degree of thermal conductivity. The first and second components 64, 66 are arranged such that the second component 66 comprises at least a portion of the outer surface 60 of the support cylinder 18 so that the second component may be in contact with heating element 34. Such an arrangement advantageously maximizes the transfer of heat from the heating element 34 to the film plies 14a, b while, at the same time, minimizing the transfer of heat from the heating element 34 to the cylinder 18.

More specifically, the second component 66 has a relatively low degree of thermal conductivity in comparison to the first component 64, i.e., is a thermally insulating material, and is in direct contact with the heat element 34. This ensures that as much heat as possible is transferred from the heating element 34 to the film plies 14a, b to effect a strong heat-seal 44 without under-sealing. This increases the efficiency of the sealing device by reducing the energy requirements thereof. At the same time, the low conductivity second component 66 is positioned between the heating element 34 and the higher conductivity first component 64, and thus slows the rate of heat transfer from the heating element to the first component 64 of the cylinder.

In addition to minimizing heat-transfer to support cylinder 18 from heating element 34, both the construction of support cylinder 18 and the configuration and positioning of heating element 34 relative to the suppot cylinder also facilitates the dissipation of heat that may nevertheless transfer to cylinder 18 from heating element 34 during heat-sealing operations. First, the relatively high thermal conductivity of the first component 64 allows such heat to quickly move to the surface of cylinder 18, where it transfers to the surrounding air via convection. Secondly, convection from cylinder 18 is augmented by constructing the cylinder such that the first component 64 occupies the majority of the surface area of the cylinder as shown (this is discussed in further detail below). Third, heat dissipation via convection is further assisted by the rotational action of cylinder 18 during heat-sealing operations. Finally, heat dissipation is also aided by the relatively large size and surface area of cylinder 18 in comparison to the relatively small area of contact arc 62 between the heating element 34 and the outer surface 60 of the cylinder.

Figure 6:
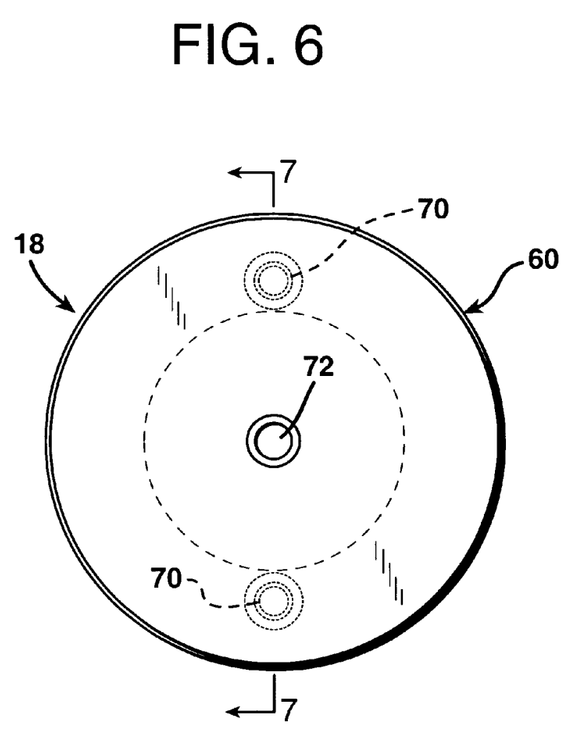
FIG. 6 is a plan view of the support cylinder shown in FIG. 5.
Figure 7:
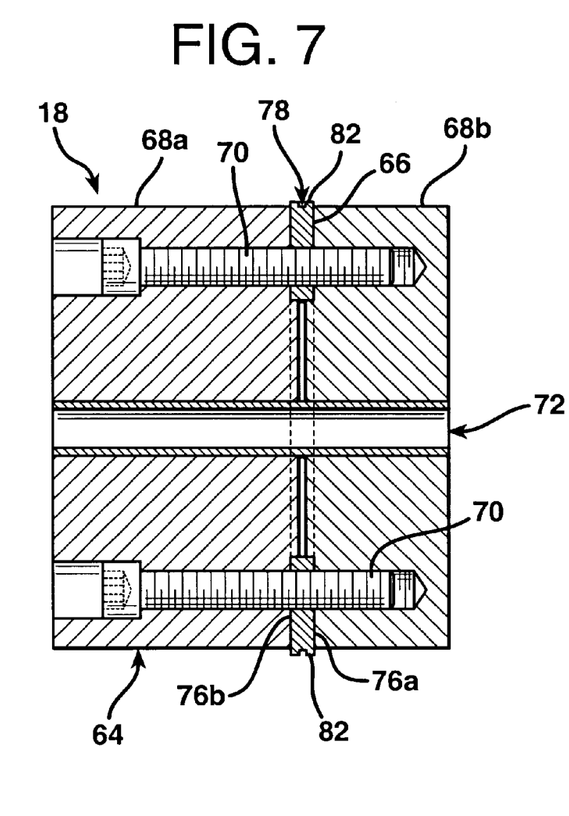
FIG. 7 is a cross-sectional view of the support cylinder as taken along lines 7—7 in FIG. 6.
Figure 8:
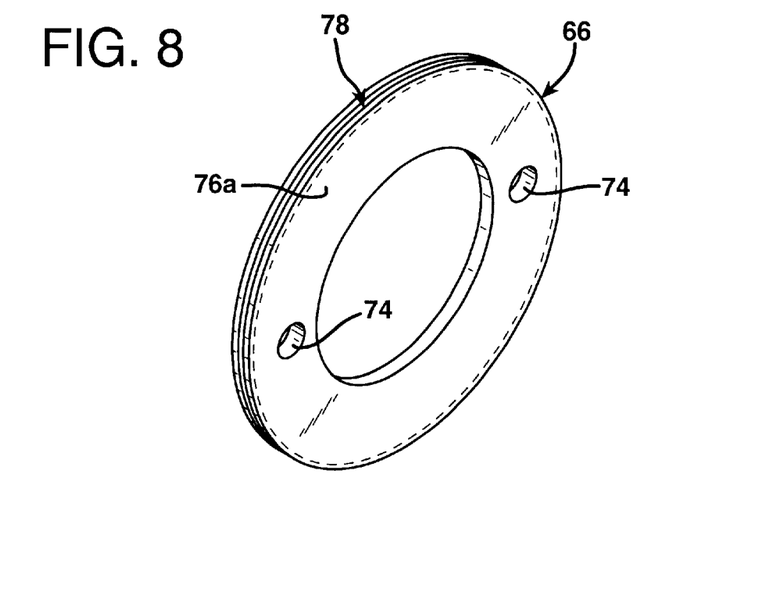
FIG. 8 is a perspective view of the second component 66 of cylinder 18 as shown in FIG. 7.
Figure 9:
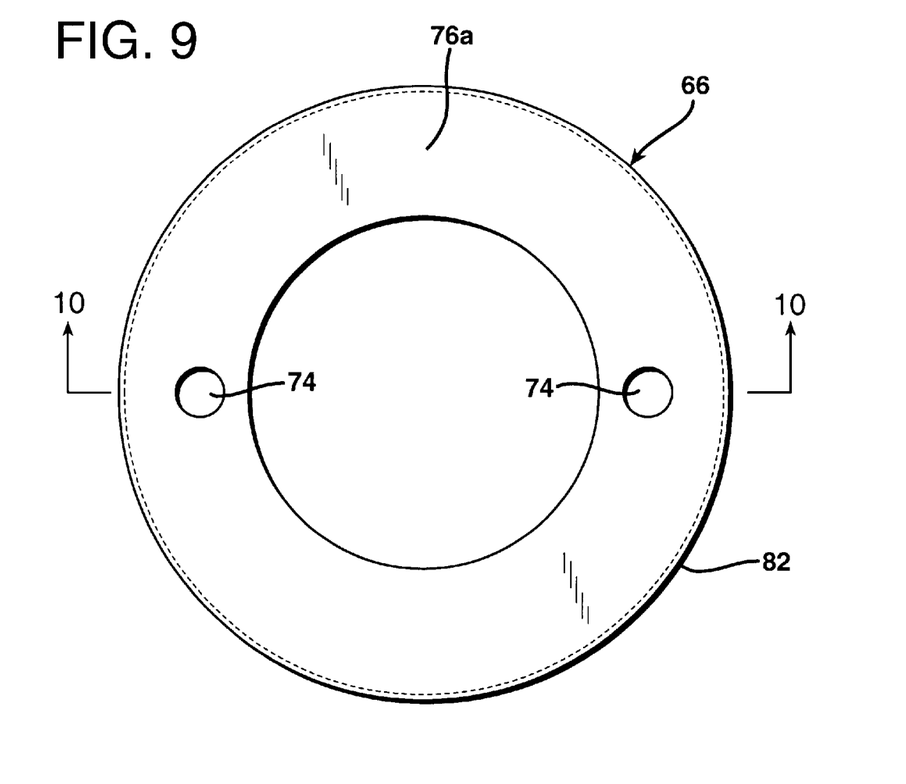
FIG. 9 is a plan view of the second component 66 shown in FIG. 8.
Figure 10:
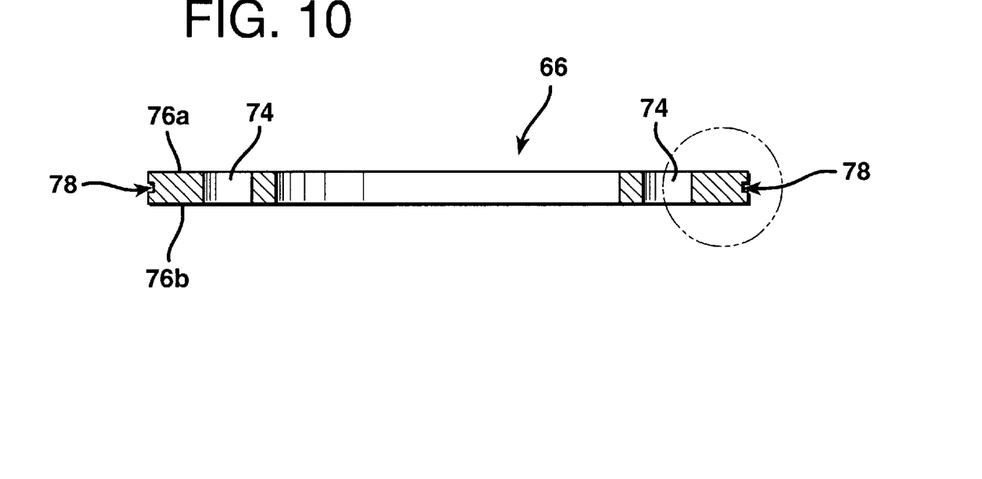
FIG. 10 is a cross-sectional view of the second component 66 as taken along lines 10—10 in FIG. 9.

FIGS. 5–7 illustrate in further detail a preferred construction for support cylinder 18, namely, a three-ply construction in which the second component 66 is sandwiched between the first component 64. As shown most clearly in the cross-sectional view of FIG. 7, this may be accomplished by constructing first component 64 from two separate cylindrical pieces 68a and 68b. The two pieces 68a, b are fastened together by a pair of screws 70, and sandwich the second, low conductivity component 66 between pieces 68a, b. Each piece 68a, b contains part of a central bore 72 which, when support cylinder 18 is fully assembled as shown, allows the cylinder to receive a retaining pin or axle (not shown) so that the cylinder may rotate about such pin or axle. Pieces 68a,b of first component 64 preferably comprise a metal or other material having a high degree of thermal conductivity. A preferred example of a suitable metal is aluminum. The portion of outer surface 60 of cylinder 18 as provided by the first component 64 preferably has a knurled texture as shown to facilitate film handling, i.e., by allowing the cylinder to engage the film web 12 without slipping, particularly when second cylinder 20 comprises a resilient material.

Figure 11:
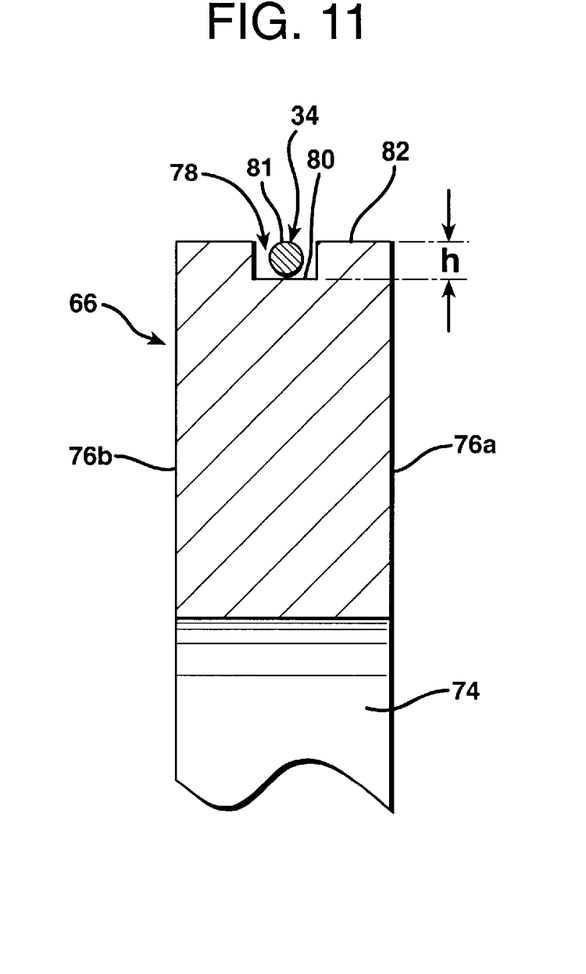
FIG. 11 is a detailed view of the circled portion of the second component 66 as indicated in FIG. 10 (rotated 90° counter-clockwise), and also shows heating element 34 disposed in groove 78.

Referring now to FIGS. 8–11, the second component 66 will be described in further detail. As shown, second component 66 is preferably disc-shaped, with a pair of holes 74 to accommodate the screws 70 that sandwich pieces 68a,b of first component 64 against both major surfaces 76a and 76b of the second component. A preferred feature of second component 66 is that it includes a groove 78 to receive heating element 34 as support cylinder 18 rotates against the heating element. Thus, heating element 'rides' in groove 78 as the support cylinder 18 rotates against the heating element. This is beneficial in maintaining the heating element 34 at a desired position relative to the outer surface 60 of support cylinder 18. As shown in FIG. 11, both the heating element 34 and groove 78 may have substantially the same height "h" relative to the bottom 80 of the groove so that the top 81 of the heating element and outer circumference 82 of second component 66 are coextensive. Alternatively, the top 81 of heating element 34 may extend beyond the outer circumference 82 of second component 66 or vise versa, i.e., the outer circumference 82 may extend beyond the top 81 of the heating element. For example, when sealing a pair of relatively thick film plies, it may be desirable for the heating element 34 to extend beyond the outer circumference 82 of the second component 66. Similarly, when sealing very thin films together, it may be desirable for the heating element to have a smaller diameter than the height "h" of the groove so that the top of the heating element does not extend beyond the outer circumference of the second element.

As perhaps best shown in FIGS. 7 and 5, the outer circumference 82 of second component 66 may extend from the portion of surface 60 provided by the first component 64, while the bottom 80 of groove 78 may be coextensive with the portion of surface 60 provided by the first component 64. This configuration is not critical, however, and may be varied as desired.

The second component 66 preferably comprises a thermally insulating (i.e., low thermal conductivity) material with high strength and high heat tolerance, and which can rotate against the heating element 34 with minimal friction and wear. A preferred material is a high-temperature-resistant polymeric material that meets the foregoing characteristics such as, e.g., polyimide. Another example of a suitable material for component 66 is a ceramic material.

As noted above, and referring back to FIGS. 1–3, cylinders 18 and 20 may form part of the conveying mechanism. This is not essential, however, as other means may be provided for conveying the film web 12 through the apparatus 10 and apparatus of the present invention, e.g., a separate pair of nip rollers that are not connected with the sealing device 32. However, for reasons of simplicity and economy, support cylinder 18 preferably forms part of the conveying mechanism along with the second cylinder 20. Second cylinder 20 is rotatable and is preferably positioned in abutting relationship with support cylinder 18 at contact arc 62 so that heating element 34 is positioned between and in contact with both cylinders at the contact arc. In addition to facilitating the conveyance of the film web 12 through the apparatus, this arrangement assists in making heat-seal 44 by both facilitating the movement of the juxtaposed film plies 14a, b past the heating element 34 and maintaining the film plies and heating element in proper position to make the heat-seal at a desired location along the films. Being in abutting relationship with cylinder 18 at contact arc 62, second cylinder 20 also facilitates the creation of heat-seal 44 by applying pressure to the juxtaposed film plies 14a, b at contact arc 62 and thereby forces the film plies against the heating element 34.

Preferably, the second cylinder 20 comprises a pliant material, such as, e.g., rubber or RTV silicone. Particularly when cylinders 18 and 20 form part of the conveying mechanism of apparatus 10, one or both cylinders are preferably coupled to a power source having a rotational output to cause the cylinders to rotate. As illustrated in FIG. 1, for example, second cylinder 20 may be axially coupled to a drive motor 84 which, when power (e.g., electricity) is supplied thereto, causes cylinder 20 to rotate. Since the cylinder 20 is positioned in abutting relationship with cylinder 18 as shown, the rotation of cylinder 20 causes cylinder 18 to rotate. Alternatively, motor 84 could be coupled instead to support cylinder 18 or, as a further alternative, separate drive motors could be coupled to both cylinders, e.g., to maintain a high degree of tension in the film web between cylinders 18, 20 and a second pair of drive cylinders.

Referring now to FIGS. 3–4 and 12–13, heating element 34 will be described in greater detail. Nodes 38 and 42 secure heating element 34 in a fixed position as shown while support cylinder 18 rotates against the heating element. The nodes 38, 42 may be any type of retaining device capable of firmly holding the respective ends 36 and 40 of heating element 34 in place, e.g., a clamp, and which also permits the heating element to be quickly and easily removed and replaced as needed, e.g., via the action of a set screw in each node that can be loosened to allow removal of the heating element and tightened to hold the heating element in place.

The nodes 38, 42 may either be conductive or non-conductive. A conductive device such as an electrode both retains the ends 36, 40 and also transmits electrical energy to/from the heating element 34. A non-conductive node simply holds end 36, 40 in place while other means transmit energy to/from the heating element, e.g., the heating means may extend beyond both of ends 36, 40 and be connected directly to a source of electricity. If desired or necessary, one or both of ends 36, 40 may be in the form of a spring to maintain a desired level of tension in heating element 34 between nodes 38, 42, e.g., to offset any stretching that may occur in the heating element over time. Alternatively, one or both of nodes 38, 42 may be biased away from one another, e.g., by spring tension.

Heating element 34 may be any device capable of heating to a predetermined temperature sufficient to heat-seal film plies 14a,b together. Such temperature, i.e., the "sealing temperature," may readily be determined by those of ordinary skill in the art without undue experimentation for a given application based on the composition and thickness of the film plies to be sealed, the speed at which the film plies move against the heating element, and the pressure at which the film plies and heating element are urged together by cylinders 18 and 20 at contact arc 62. As an example, when the sealing device 32 is used to manufacture foam-in-place, polyurethane foam cushions using polyethylene-based film ranging in thickness from about 0.5 to about 2 mils, the sealing temperature to which heating element 34 is heated may range from about 300 to about 500° F.

Suitable types of devices for heating element 34 include one or more wires comprising metal and/or other electrically conductive materials; one or more ribbons comprising metal; circuit-printed plastic ribbons, e.g., metal printed on a plastic substrate comprising polyethylene terephthalate (PET); and other suitable electrically conductive devices.

The drawings illustrate heating element 34 in the form of a wire. When heating element 34 assumes such a form, the wire may have any desired cross-sectional shape, including round, square, oval, rectangular, etc. The actual shape to be employed in a given application, i.e., the cross-sectional shape that provides desired heat-sealing characteristics for such application, may be readily determined by those of ordinary skill in the art without undue experimentation, based on, e.g., the thickness of the film plies to be sealed together, their composition, the speed at which they are driven past the sealing device 32, the pressure exerted against the film plies between support cylinder 18 and second cylinder 20, etc.

In a preferred embodiment of the invention, heating element 34 comprises a first portion 86 and a second portion 88, with the first portion 86 having a higher degree of electrical resistance relative to the second portion 88. When this feature is employed, the transmission of electrical current through the heating element results in the first portion 86 heating to a higher temperature than the second portion 88 due to the higher resistance of the first portion. Thus, depending upon the amount of current transmitted through the heating element 34 and upon the differences in resistance between the first and second portions, only the first portion 86, and not the second portion 88, may be heated to the sealing temperature for film plies 14a,b.

The first portion 86 of heating element 34 is preferably positioned along the contact arc 62 of cylinder 18 as shown in FIG. 4. The second portion 86 may either span the entire contact arc 62 or, as shown, span only a portion of the contact arc. That is, second portion 86 may span between about 1% to about 100% of contact arc 62, including all sub-ranges therebetween, such as between about 5% to about 90% of contact arc 62, 10% to 50%, etc. As an example, when contact arc 62 has a length of about 1.5 inches, second portion 86 may have a length within such contact arc of about 0.25 inch (i.e., the second portion 86 spans about 17% of the length of contact arc 62).

Relative to the total circumference of the outer surface 60 of support cylinder 18, the first portion 86 may span between about to 1/60 about 1/2 of the total circumference of such outer surface 60. More preferably, the first portion 86 may span between about 1/50 to about 1/3 of the circumference of cylinder 18 and, more preferably still, from about 1/40 to about 1/4 of the total circumference 60 of cylinder 18. For example, the first portion 86 of heating element 34 may have a length of about 0.25 inch when the outer surface 60 of support cylinder 18 has a total circumferential distance of about 8 inches so that first portion 86 spans about 1/32 of the total circumferential distance around the outer surface 60 of cylinder 18.

Constructing heating element 34 from first and second portions 86, 88 as described immediately above is advantageous in that such a construction provides a relatively small portion that is heated to the sealing temperature for film plies 14a, b. This, in turn, has been found to reduce the likelihood that the heating element will burn through the film plies and/or cause the film plies to become melted onto the heating element. Such construction also results in less overall heat generated by the heating element, and less energy usage. Further, because only a portion of the heating element 34 is heated to the sealing temperature, i.e., the first portion 86, this portion heats to the sealing temperature from room temperature very quickly, usually in less than 1 second. Thus, the heating element does not have to be kept warm during pauses in sealing operations by maintaining a low or "idling" current through the element. Instead, current is sent through the heating element just prior to sealing the two film plies 14a,b together and then stopped immediately after. This quick-heating feature also allows the current to be pulsed through the heating element 34 while a heat-seal 44 is being made to further decrease the chances of burning through the film plies. Such current pulsing results in oscillation in the temperature of first portion 86 during heat-sealing, with the temperature peaks and troughs being just above and just below a predetermined average temperature.

Figure 12:
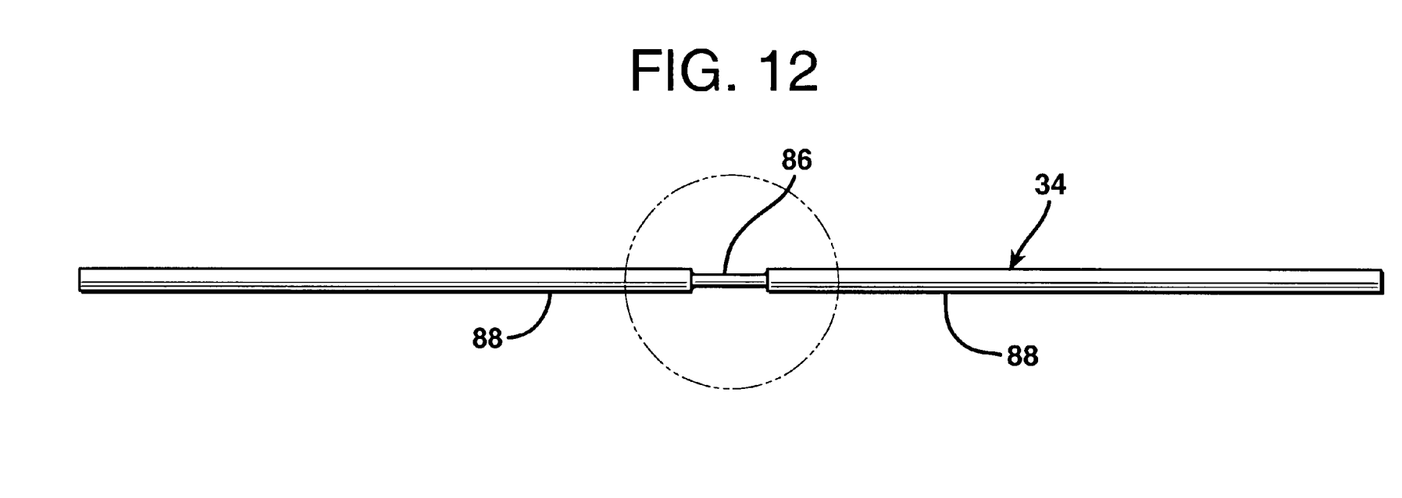
FIG. 12 is an elevational view of the heating element 34 as shown in FIGS. 1–4.
Figure 13:
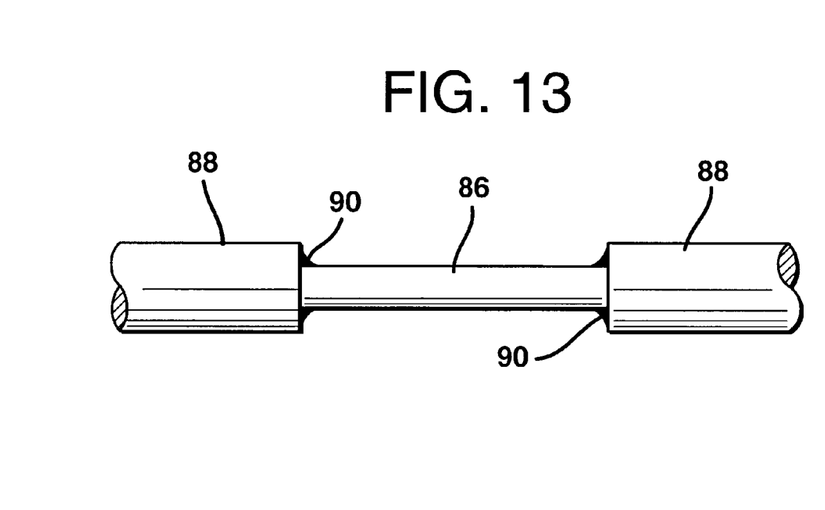
FIG. 13 is a detailed view of the circled portion of the heating element 34 as indicated in FIG. 12.

The difference in resistance between the first and second portions 86, 88 may be accomplished by constructing heating element 34 from two different materials and/or two different diameters. FIGS. 12–13 illustrate a preferred construction for heating element 34 when it is in the form of a wire. As shown, first portion 86 has a smaller diameter than second portion 88. In addition, first portion 86 may be formed from a higher resistance material than second portion 88.

As an example, first portion 86 may have a diameter of 0.010 inch while second portion 88 has a diameter of 0.015 inch. Instead or in addition, the first portion 86 may comprise a relatively high-resistance metal, such as, e.g., a nickel/chromium alloy, while the second portion 88 may comprise a relatively low-resistance metal, such as stainless steel. The first and second portions 86, 88 may be welded together, e.g., via electron beam welding, at interfaces 90. When heating element 34 had such a construction, two 0.75 mil polyethylene Mm plies were heat-sealed together as at 44 by employing a pulsed-current technique as follows: 5 volts were applied across the heating element for 20 milliseconds followed by zero voltage for 60 nilliseconds, then 5 volts again for 20 milliseconds, etc. until a complete heat-seal 44 was formed across the opening to a container 16.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention.

What is claimed is:

1. A device for sealing two plies of plastic film together, comprising:
    a. an electrically conductive heating element having
        (1) a first end secured to a first node,
        (2) a second end secured to a second node,
        (3) a first portion, and
        (4) a second portion, wherein said first portion has a higher degree of electrical resistance relative to said second portion, said first portion being formed of a different material or having a different diameter than said second portion; and
    b. a rotatable support cylinder having an outer, circumferential surface, said cylinder being positioned in abutting relationship with said heating element and capable of rotating against said heating element along a predetermined contact arc such that less than a complete circumference of said outer surface of said cylinder is in contact with said heating element,
    whereby, two plies of juxtaposed plastic film may be sealed together by bringing the juxtaposed film plies into contact with said heating element along said contact arc and causing sufficient current to flow through said heating element that said heating element heats to a sealing temperature that causes the juxtaposed film plies to seal together.

2. The device of claim 1, wherein said first portion of said heating element is positioned along said contact arc.

3. The device of claim 2, wherein only said first portion of said heating element is heated to said sealing temperature.

4. The device of claim 1, wherein said support cylinder comprises
    a. a first component having a relatively high degree of thermal conductivity; and
    b. a second component having a relatively low degree of thermal conductivity, said second component comprising at least a portion of the outer surface of said support cylinder such that said second component is in contact with said heating element.

5. The device of claim 4, wherein said second component includes a groove to receive said heating element as said support cylinder rotates against said heating element.

6. The device of claim 1, further including a second rotatable cylinder positioned in abutting relationship with said support cylinder at said contact arc so that said heating element is positioned between and in contact with both cylinders at said contact arc.

7. The device of claim 6, wherein one or both of said support cylinder and said second cylinder are coupled to a power source having a rotational output to cause said cylinders to rotate.

8. An apparatus for dispensing fluid into flexible containers and enclosing the fluid within the containers, comprising:
    a. a mechanism that conveys a web of film along a predetermined path of travel, said film web comprising two juxtaposed plies of plastic film that define a partially-formed flexible container;
    b. a dispenser through which fluid may flow in predetermined amounts, said dispenser positioned adjacent the travel path of the film web such that said dispenser can dispense the fluid into the partially-formed flexible container; and c. a device for sealing the plies of plastic film together so that the partially-formed container can be completed to thereby enclose the fluid therein, said sealing device comprising
  (1) an electrically conductive heating element having
    (a) a first end secured to a first node,
    (b) a second end secured to a second node,
    (c) a first portion, and
    (d) a second portion, wherein said first portion has a higher degree of electrical resistance relative to said second portion, said first portion being formed of a different material or having a different diameter than said second portion, and
  (2) a rotatable support cylinder having an outer, circumferential surface, said cylinder being positioned in abutting relationship with said heating element and capable of rotating against said heating element along a predetermined contact arc such that less than a complete circumference of said outer surface of said cylinder is in contact with said heating element, said contact arc being positioned in the travel path of the film web,
whereby, the two plies of juxtaposed plastic film are sealed together when the conveying mechanism brings the film web into moving contact with said heating element along said contact arc and sufficient current is caused to flow through said heating element that said heating element heats to a sealing temperature that causes the juxtaposed film plies to seal together.

9. The apparatus of claim 8, wherein said first portion of said heating element is positioned along said contact arc.

10. The apparatus of claim 9, wherein only said first portion of said heating element is heated to said sealing temperature.

11. The apparatus of claim 8, wherein said support cylinder comprises
  a. a first component having a relatively high degree of thermal conductivity; and
  b. a second component having a relatively low degree of thermal conductivity, said second component comprising at least a portion of the outer surface of said support cylinder such that said second component is in contact with said heating element.

12. The apparatus of claim 11, wherein said second component includes a groove to receive said heating element as said support cylinder rotates against said heating element.

13. The apparatus of claim 8, further including a second rotatable cylinder positioned in abutting relationship with said support cylinder at said contact arc so that said heating element is positioned between and in contact with both cylinders at said contact arc.

14. The apparatus of claim 13, wherein one or both of said support cylinder and said second cylinder are coupled to a power source having a rotational output to cause said cylinders to rotate.

15. The apparatus of claim 8, wherein said dispenser is adapted to dispense a fluid selected for polyols, isocyanates, and mixtures of polyols and isocyanates.

16. A system for dispensing fluid into flexible containers and enclosing the fluid within the containers, comprising;
  a. web of film comprising two juxtaposed plies of plastic film that define a partially-formed flexible container;
  b. a mechanism that conveys said film web along a predetermined path of travel;
  c. a fluid source containing therein a fluid;
  d. a dispenser through which fluid may flow in predetermined amounts, said dispenser being in fluid communication with said fluid source and positioned adjacent the travel path of said film web such that said dispenser can dispense said fluid into said container; and
  e. a device for sealing the plies of plastic film together to enclose said fluid within said container, said sealing device comprising
    (1) an electrically conductive heating element having
      (a) a first end secured to a first node,
      (b) a second end secured to a second node,
      (c) a first portion, and
      (d) a second portion, wherein said first portion has a higher degree of electrical resistance relative to said second portion, said first portion being formed of a different material or having a different diameter than said second portion, and
    (2) a rotatable support cylinder having an outer, circumferential surface, said cylinder being positioned in abutting relationship with said heating element and capable of rotating against said heating element along a predetermined contact arc such that less than a complete circumference of said outer surface of said cylinder is in contact with said heating element, said contact arc being positioned in the travel path of the film web,
whereby, the two plies of juxtaposed plastic film are sealed together when the conveying mechanism brings the film web into moving contact with said heating element along said contact arc and sufficient current is caused to flow through said heating element that said heating element heats to a sealing temperature that causes the juxtaposed film plies to seal together.

17. The system of claim 16, wherein said first portion of said heating element is positioned along said contact arc.

18. The system of claim 17, wherein said first portion of said heating element is heated to said sealing temperature.

19. The system of claim 16, wherein said support cylinder comprises
  a. a first component having a relatively high degree of thermal conductivity; and
  a second component having a relatively low degree of thermal conductivity, said second component comprising at least a portion of the outer surface of said support cylinder such that said second component is in contact with said heating element.

20. The system of claim 19, wherein said second component includes a groove to receive said heating element as said support cylinder rotates against said heating element.

21. The system of claim 16, further includes a second rotatable cylinder positioned in abutting relationship with said support cylinder at said contact arc so that said heating element is positioned between and in contact with both cylinders at said contact arc.

22. The system of claim 21, wherein one or both of said support cylinder and said second cylinder are coupled to a power source having a rotational output to cause said cylinders to rotate.

23. The system of claim 16, wherein said fluid is selected from polyols, isocyanates, and mixtures of polyols and isocyanates.

24. The system of claim 16, wherein:
said fluid comprises one or more polyols;
said dispenser is in fluid communication with a second fluid source containing therein one or more isocyanates; and
said dispenser mixes the polyols and isocyanates and dispenses the mixture into said containers.

* * * * *